(12) United States Patent
Dallakian

(10) Patent No.: US 6,614,601 B2
(45) Date of Patent: *Sep. 2, 2003

(54) GIMBALLED OPTICAL MOUNT

(75) Inventor: Armen Yu. Dallakian, Yerevan (AM)

(73) Assignee: Newport Corporation, Irvine, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 09/797,996

(22) Filed: Mar. 2, 2001

(65) Prior Publication Data

US 2001/0036023 A1 Nov. 1, 2001

Related U.S. Application Data

(63) Continuation of application No. 09/215,529, filed on Dec. 18, 1998, now Pat. No. 6,198,580.

(30) Foreign Application Priority Data

Aug. 17, 1998 (AM) .................................................. 98056

(51) Int. Cl.[7] .............................. G02B 27/02; G02B 7/02
(52) U.S. Cl. ....................... 359/804; 359/813; 359/819; 359/822
(58) Field of Search ................................. 359/804, 813, 359/814, 819, 822

(56) References Cited

U.S. PATENT DOCUMENTS

| | | | |
|---|---|---|---|
| 1,143,165 A | 6/1915 | Begusch | 33/818 |
| 1,306,906 A | 6/1919 | Jaques, Sr. | 33/817 |
| 2,367,139 A | 1/1945 | Ress | 359/822 |
| 3,357,268 A | * 12/1967 | Richter | 74/89.23 |
| 3,442,475 A | 5/1969 | Rivin | 248/616 |
| 3,460,786 A | 8/1969 | Rivin | 248/634 |
| 3,478,608 A | 11/1969 | Met | 74/89.23 |
| 3,533,012 A | 10/1970 | Johnson et al. | 372/107 |
| 3,565,515 A | 2/1971 | De Mey, II | 359/874 |
| 3,577,791 A | 5/1971 | Vanden Broek | 74/89.23 |
| 3,578,278 A | 5/1971 | Pickering | 248/550 |
| 3,601,476 A | 8/1971 | MacKenzie | 359/874 |
| 3,620,558 A | 11/1971 | MacMillan | 403/290 |
| 3,667,525 A | 6/1972 | Spieth | 411/292 |
| 3,751,025 A | 8/1973 | Beery et al. | 267/166.1 |
| 3,751,139 A | * 8/1973 | Malherbe | 359/822 |
| 3,917,201 A | 11/1975 | Roll | 248/550 |

(List continued on next page.)

FOREIGN PATENT DOCUMENTS

| | | |
|---|---|---|
| CA | 2199423 | 3/1996 |
| GB | 2 124 402 A | 7/1982 |
| GB | 2 131 971 A | 6/1984 |
| JP | 03021894 | 1/1991 |
| JP | 08088167 | 9/1994 |
| JP | 09330875 | 6/1996 |
| JP | 10144601 | 11/1996 |

OTHER PUBLICATIONS

J. M. Kahn, C. A. Burrus, and G. Raybon, High–Stability 1.5 um External–Cavity Semiconductor Lasers for Phase–Lock Applications, Photonics Technology Letters, vol. 1. No. 7, Jul. 1989.

P. Zorabedian and W. R. Trutna, Jr., "Interference–filter–tuned, alignment–stabilized, semiconductor external–cavity laser", 1988, Optical Society of America. Jul. 1988.

(List continued on next page.)

Primary Examiner—Georgia Epps
Assistant Examiner—Tim Thompson
(74) Attorney, Agent, or Firm—Irell & Manella LLP

(57) ABSTRACT

An optical mount for an optical element which has an optical surface. The mount includes a first plate and a second plate which holds the optical element. The second plate may have a spherical bearing surface that cooperates with the first plate so that the optical element pivots about a point on the optical surface. The mount has a single first adjustment device to pivot the optical element about one axis and a single second adjustment device to pivot the element about a second perpendicular axis.

4 Claims, 3 Drawing Sheets

U.S. PATENT DOCUMENTS

| | | | |
|---|---|---|---|
| 3,945,246 A | 3/1976 | Wadensten | 73/666 |
| 4,030,811 A | 6/1977 | Khoe et al. | 385/91 |
| 4,065,203 A | 12/1977 | Goell et al. | 385/91 |
| 4,079,404 A | 3/1978 | Comerford et al. | 372/50 |
| 4,088,396 A * | 5/1978 | Edelstein | 359/822 |
| 4,119,363 A | 10/1978 | Camlibel et al. | 385/84 |
| 4,144,504 A | 3/1979 | Leggett et al. | 372/36 |
| 4,164,363 A | 8/1979 | Hsu | 385/88 |
| 4,167,744 A | 9/1979 | Nyul | 257/98 |
| 4,199,222 A | 4/1980 | Ikushima et al. | 385/92 |
| 4,237,474 A | 12/1980 | Ladany | 385/49 |
| 4,268,113 A | 5/1981 | Noel, Jr. | 385/92 |
| 4,295,152 A | 10/1981 | Khoe et al. | 257/680 |
| 4,296,998 A | 10/1981 | Dufft | 385/91 |
| 4,316,678 A | 2/1982 | F'Geppert | 403/259 |
| 4,332,469 A | 6/1982 | Wendland | 356/222 |
| 4,350,867 A | 9/1982 | Kinoshita et al. | 219/121.63 |
| 4,355,323 A | 10/1982 | Kock | 267/680 |
| 4,357,072 A | 11/1982 | Goodfellow et al. | 385/91 |
| 4,387,956 A | 6/1983 | Cline | 385/136 |
| 4,403,243 A | 9/1983 | Hakamada | 257/772 |
| 4,435,037 A | 3/1984 | Abramson et al. | 385/90 |
| 4,469,399 A | 9/1984 | Cowen et al. | 385/138 |
| 4,469,929 A | 9/1984 | Rosen et al. | 219/121.64 |
| 4,479,698 A | 10/1984 | Landis et al. | 385/91 |
| 4,500,165 A | 2/1985 | Scholl et al. | 385/90 |
| 4,506,108 A | 3/1985 | Kersch et al. | 174/52.4 |
| 4,523,802 A | 6/1985 | Sakaguchi et al. | 385/91 |
| 4,523,810 A | 6/1985 | Goss et al. | 385/51 |
| 4,525,659 A | 6/1985 | Imahashi et al. | 318/649 |
| 4,550,410 A | 10/1985 | Chenausky et al. | 372/97 |
| 4,615,031 A | 9/1986 | Eales et al. | 372/36 |
| 4,623,220 A | 11/1986 | Grabbe et al. | 385/91 |
| 4,647,147 A | 3/1987 | Pikulski et al. | 385/52 |
| 4,647,331 A | 3/1987 | Koury, Jr. et al. | 156/273.9 |
| 4,657,429 A | 4/1987 | Morris | 403/362 |
| 4,664,732 A | 5/1987 | Campbell et al. | 156/158 |
| 4,673,244 A | 6/1987 | Miles | 385/38 |
| 4,673,245 A | 6/1987 | Kling et al. | 385/80 |
| 4,677,290 A | 6/1987 | Mitch | 356/152.1 |
| 4,678,271 A | 7/1987 | Beaulieu | 385/134 |
| 4,679,908 A | 7/1987 | Goodwin | 385/91 |
| 4,701,013 A | 10/1987 | Jurczyszyn et al. | 385/15 |
| 4,702,556 A | 10/1987 | Ishii et al. | 385/91 |
| 4,708,429 A | 11/1987 | Clark et al. | 385/91 |
| 4,714,315 A | 12/1987 | Krause | 385/96 |
| 4,720,163 A | 1/1988 | Goodwin et al. | 385/90 |
| 4,746,195 A | 5/1988 | Auracher et al. | 385/52 |
| 4,747,657 A | 5/1988 | Chaoui et al. | 700/279 |
| 4,748,632 A | 5/1988 | Preston | 372/32 |
| 4,759,600 A | 7/1988 | Caron et al. | 385/72 |
| 4,763,979 A | 8/1988 | Heywang | 385/90 |
| 4,767,174 A | 8/1988 | Carenco et al. | 385/97 |
| 4,773,730 A | 9/1988 | Sedlmayr | 385/137 |
| 4,779,946 A | 10/1988 | Pimpinella et al. | 385/88 |
| 4,779,959 A | 10/1988 | Saunders | 349/198 |
| 4,782,223 A | 11/1988 | Suzuki | 250/214 R |
| 4,787,691 A | 11/1988 | Lorenzo et al. | 385/3 |
| 4,800,262 A | 1/1989 | Lentine | 257/22 |
| 4,807,750 A * | 2/1989 | Ryder et al. | 206/5.1 |
| 4,823,220 A | 4/1989 | Milster et al. | 369/13.3 |
| 4,837,768 A | 6/1989 | Schmid | 372/36 |
| 4,842,397 A | 6/1989 | Eisler | 359/896 |
| 4,850,261 A | 7/1989 | Greene | 91/362 |
| 4,850,671 A | 7/1989 | Finzel | 385/69 |
| 4,854,667 A | 8/1989 | Ebata et al. | 385/134 |
| 4,913,527 A | 4/1990 | Jessop | 359/823 |
| 4,914,867 A | 4/1990 | Saito et al. | 451/292 |
| 4,915,482 A | 4/1990 | Collins et al. | 359/276 |
| 4,916,635 A | 4/1990 | Singer et al. | 700/254 |
| 4,938,564 A | 7/1990 | Romero | 359/896 |
| 4,966,474 A | 10/1990 | Geiger | 384/517 |
| 4,978,910 A | 12/1990 | Knox et al. | 324/96 |
| 4,988,159 A | 1/1991 | Turner et al. | 385/33 |
| 4,988,165 A | 1/1991 | Ishii et al. | 359/814 |
| 5,000,415 A | 3/1991 | Sandercock | 248/550 |
| 5,044,719 A | 9/1991 | Nakamura | 385/76 |
| 5,058,124 A | 10/1991 | Cameron et al. | 372/107 |
| 5,062,012 A | 10/1991 | Maeda et al. | 360/75 |
| 5,068,749 A | 11/1991 | Patel | 349/198 |
| 5,077,747 A | 12/1991 | Hemmer et al. | 372/20 |
| 5,132,824 A | 7/1992 | Patel et al. | 349/1 |
| 5,138,496 A | 8/1992 | Pong | 359/822 |
| 5,140,470 A | 8/1992 | Luecke | 359/818 |
| 5,146,532 A | 9/1992 | Hodge | 385/136 |
| 5,150,236 A | 9/1992 | Patel | 349/198 |
| 5,172,160 A | 12/1992 | Van Eijk et al. | 355/53 |
| 5,179,618 A | 1/1993 | Anton | 385/136 |
| 5,183,350 A | 2/1993 | Kramer | 403/4 |
| 5,189,725 A | 2/1993 | Bensel, III et al. | 385/135 |
| 5,191,587 A | 3/1993 | Hanson et al. | 372/21 |
| 5,194,993 A | 3/1993 | Bedzyk | 359/813 |
| 5,214,735 A | 5/1993 | Henneberger et al. | 385/136 |
| 5,218,258 A | 6/1993 | Shirasu et al. | 310/323.03 |
| 5,218,610 A | 6/1993 | Dixon | 372/20 |
| 5,219,051 A | 6/1993 | Davis | 188/378 |
| 5,251,863 A | 10/1993 | Gossman et al. | 248/550 |
| 5,285,995 A | 2/1994 | Gonzalez et al. | 248/550 |
| 5,289,559 A | 2/1994 | Wilson | 385/136 |
| 5,300,755 A | 4/1994 | Nishitani et al. | 219/121.63 |
| 5,311,278 A | 5/1994 | Rosencher | 356/326 |
| 5,319,435 A | 6/1994 | Melle et al. | 359/32 |
| 5,321,539 A | 6/1994 | Hirabayashi et al. | 349/198 |
| 5,327,061 A | 7/1994 | Gullapalli | 318/649 |
| 5,337,383 A | 8/1994 | DeAngelis et al. | 385/49 |
| 5,367,140 A | 11/1994 | Jouaneh et al. | 219/121.64 |
| 5,410,145 A | 4/1995 | Coroy | 250/214 C |
| 5,428,225 A | 6/1995 | Silva et al. | 257/14 |
| 5,428,635 A | 6/1995 | Zhiglinsky et al. | 372/92 |
| 5,434,944 A | 7/1995 | Kerry et al. | 385/135 |
| 5,434,945 A | 7/1995 | Burek et al. | 385/135 |
| 5,446,519 A | 8/1995 | Makinouchi | 355/53 |
| 5,463,647 A | 10/1995 | Pan | 392/12 |
| 5,469,265 A | 11/1995 | Measures et al. | 356/419 |
| 5,499,261 A | 3/1996 | Welch et al. | 372/50 |
| 5,502,598 A * | 3/1996 | Kimura et al. | 359/814 |
| 5,528,718 A | 6/1996 | Ray et al. | 385/136 |
| 5,530,547 A * | 6/1996 | Arnold | 356/458 |
| 5,530,785 A | 6/1996 | Sakamoto et al. | 385/136 |
| 5,553,186 A | 9/1996 | Allen | 385/135 |
| 5,563,972 A | 10/1996 | Krausse et al. | 385/56 |
| 5,564,537 A | 10/1996 | Shoureshi | 188/380 |
| 5,570,444 A | 10/1996 | Janssen et al. | 385/90 |
| 5,581,077 A | 12/1996 | Chirovsky et al. | 250/214 R |
| 5,598,500 A | 1/1997 | Crespel et al. | 385/139 |
| 5,603,387 A | 2/1997 | Beard et al. | 180/89.12 |
| 5,617,501 A | 4/1997 | Miller et al. | 385/134 |
| 5,619,609 A | 4/1997 | Pan et al. | 385/136 |
| 5,638,267 A | 6/1997 | Singhose et al. | 700/28 |
| 5,638,482 A | 6/1997 | Winterhoff et al. | 385/136 |
| 5,653,317 A | 8/1997 | Wakui | 188/378 |
| 5,655,045 A | 8/1997 | Morlion et al. | 385/137 |
| 5,660,255 A | 8/1997 | Schubert et al. | 188/378 |
| 5,668,906 A | 9/1997 | Yamamura et al. | 385/83 |
| 5,673,350 A | 9/1997 | Song et al. | 385/93 |
| 5,689,607 A | 11/1997 | Vincent et al. | 385/136 |
| 5,694,257 A * | 12/1997 | Arnone et al. | 359/822 |
| 5,717,804 A | 2/1998 | Pan et al. | 385/94 |
| 5,725,066 A | 3/1998 | Beard et al. | 180/89.12 |
| 5,737,132 A * | 4/1998 | Luecke et al. | 359/819 |
| 5,745,633 A | 4/1998 | Giebel et al. | 385/136 |

| | | | |
|---|---|---|---|
| 5,748,821 A | 5/1998 | Schempp et al. | 385/76 |
| 5,751,877 A | 5/1998 | Ishizaka et al. | 385/93 |
| 5,757,561 A | 5/1998 | Sechrist et al. | 359/822 |
| 5,758,004 A | 5/1998 | Alarcon et al. | 385/135 |
| 5,761,360 A | 6/1998 | Grois et al. | 385/81 |
| 5,765,800 A | 6/1998 | Watanabe et al. | 248/550 |
| 5,774,614 A | 6/1998 | Gilliland et al. | 385/88 |
| 5,793,920 A | 8/1998 | Wilkins et al. | 385/135 |
| 5,793,921 A | 8/1998 | Wilkins et al. | 385/135 |
| 5,794,912 A | 8/1998 | Whittaker et al. | 248/638 |
| 5,812,958 A | 9/1998 | Mayama | 701/111 |
| 5,823,307 A | 10/1998 | Schubert et al. | 188/378 |
| 5,825,558 A | 10/1998 | Farmiga et al. | 359/819 |
| 5,852,519 A | 12/1998 | Do et al. | 359/877 |
| 5,880,894 A | 3/1999 | Blakley | 359/819 |
| 5,909,324 A | 6/1999 | Bryant et al. | 359/822 |
| 5,930,057 A | 7/1999 | Sechrist et al. | 359/822 |
| 5,941,920 A | 8/1999 | Schubert | 70/137 |
| 5,946,023 A | 8/1999 | Blanding | 347/257 |
| 5,963,695 A | 10/1999 | Joyce | 385/88 |
| 6,016,230 A | 1/2000 | Nunnally et al. | 359/819 |
| 6,022,005 A | 2/2000 | Gran et al. | 267/136 |
| 6,198,580 B1 | 3/2001 | Dallakian | 359/822 |
| 6,209,841 B1 | 4/2001 | Houghton, Jr. et al. | 248/550 |
| 6,304,393 B1 * | 10/2001 | Sechrist et al. | 359/822 |
| 6,317,278 B1 * | 11/2001 | Metsala | 359/813 |

OTHER PUBLICATIONS

A. Schremer and C. L. Tang, "Single–Frequency tunable external–cavity semiconductor laser using an electro–optic birefringent modulator", Appl. Phys. Lett., vol. 55, No. 1, Jul. 3, 1989.

M. W. Maeda, J. S. Patel, D. A. Smith, Chinlon Lin, M. A. Saifi, and A. Von Lehman, "An Electronically Tunable Fiber Laser with a Liquid–Crystal Etalon Filter as the Wavelength–Tuning Element", IEEE Photonics Technology Letters, vol. 2, No. 11, Nov. 1990.

Katsuhiko Hirabayashi, Hiroyuki Tsuda, and Takashi Kurokawa, "Tunable Liquid–Crystal Fabry–Perol Interferometer Filter for Wavelength–Division Multiplexing Communication Systems", Journal of Lightwave Technology, vol. 11, No. 12, Dec. 1993.

Stephen R. Mallinson, "Wavelength–selective filters for single–mode fiber WDM systems using Fabry–Perot interferometers", Applied Optics, vol. 26, No. 3, Feb. 1, 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid–Crystal Fabry–Perot Interferometer", IEEE Photonics Technology Letters, vol. 3. No. 6. Jun. 1991.

John R. Andrews, "Low Voltage Wavelength Tuning of an External Cavity Diode Laser Using a Nematic Liquid Crystal–Containing Birefringent Filert", IEEE Photonics Technology Letters. vol. 2, No. 5, May 1990.

N. A. Olsson and J. P. Van Der Ziel, "Performance Characteristics of 1.5–um External Cavity Semiconductor Lasers for Coherent Optical Communication", Journal Of Lightwave Technology, vol. LT–5. No. 4, Apr. 1987.

Hecht Optics Second Edition, Eugene Hecht, reprinted 1990, reference text, pp 303 # 368.

Rivin, Eugene I., "Vibration isolation of precision equipment", Precision Engineering, 1995, pp. 41–56, vol. 17. Jan. 1995.

"Marsh Mellow Springs Vibration Isolation Design Manual", 1998, Firestone Industrial Products Company.

Rivin, Eugene I., "Shaped Elastomeric Components for Vibration Control Devices", Sound and Vibration, Jul. 1999, pp. 18–23, vol. 33, No. 7.

* cited by examiner

GIMBALLED OPTICAL MOUNT

This application is a continuation of Ser. No. 09/215,529 filed Dec. 18, 1998, now U.S. Pat. No. 6,198,580.

BACKGROUND OF THE INVENTION

1. Field of the Invention

The present invention relates to an optical mount.

2. Background Information

Mechanical mounts are commonly used to secure and vary the position of an optical element such as a mirror. The mount may be part of an optical system such as a laser or an interferometer. The system may be tuned or calibrated by varying the incident angle of the light reflected from the mirror. A conventional optical mount typically has a number of adjustment screws that can be manipulated to tilt the mirror and vary the angle of incidence.

There have been marketed gimbal optical mounts that can tilt the reflecting mirror and change the incident angle without spatially shifting the point at which the light is reflected from the mirror. This can be accomplished by reflecting light from the pivot points of the gimbal mount which are coincident with the mirror face. Gimbal mounts allow a scientist to vary the incident angle without introducing a phase shift in the reflected light.

Conventional gimbal optical mounts typically contain two concentric rings. The innermost ring holds the optical element and can rotate relative to an outer ring. The outer ring can rotate relative to an outer stationary housing about an axis that is perpendicular to the axis of rotation of the inner ring. Ring type gimbal mounts can be relatively expensive to produce.

U.S. Pat. No. 4,088,396 issued Edelstein and U.S. Pat. No. 3,357,268 issued to Richter disclose optical gimbal mounts which each have a first plate and a second plate. The first plate is typically mounted to a stationary surface such as a table. The second plate holds the optical element and has a spherical bearing surface. The spherical bearing surface cooperates with a spherical seat of the first plate to allow the second plate and optical element to pivot about a point. Unfortunately, the pivot point is located away from the optical surface of the optical element so that pivoting the element may introduce a phase shift in the reflected light.

There have been published articles which discuss the use of gimbal optical mounts that have kinematic type interfaces which pivot the optical element about a point on the optical surface. These mounts have three or four adjustment screws that are manipulated to pivot the optical element. Accurately pivoting the optical element typically requires manipulating two screws the same amount. Manipulating two screws can be both cumbersome and time consuming. For example, a gimbal mount with three or four screws requires the simultaneous manipulation of at least two screws to pivot the optical element about an axis. It would be desirable to provide an opto-mechanical mount that can tilt an optical element without introducing a spatial phase shift and which can pivot the element about an axis by manipulating only one screw.

SUMMARY OF THE INVENTION

One embodiment of the present invention is an optical mount for an optical element which has an optical surface. The mount includes a first plate, and a second plate which holds the optical element. The second plate may have a spherical bearing surface that cooperates with the first plate so that the optical element pivots about a point on the optical surface. The mount has a single first adjustment device to pivot the optical element about one axis and a single second adjustment device to pivot the element about a second perpendicular axis.

DETAILED DESCRIPTION

Figure 1:
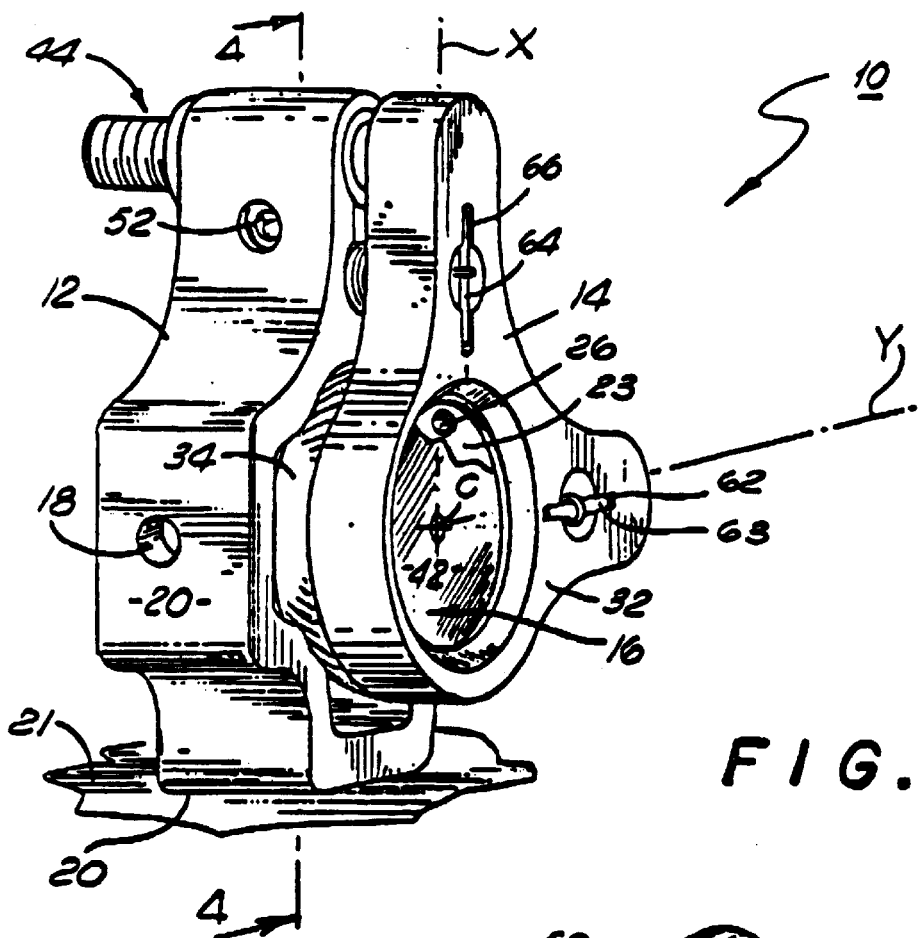
FIG. 1 is a front perspective of an embodiment of an optical mount of the present invention.
Figure 2:
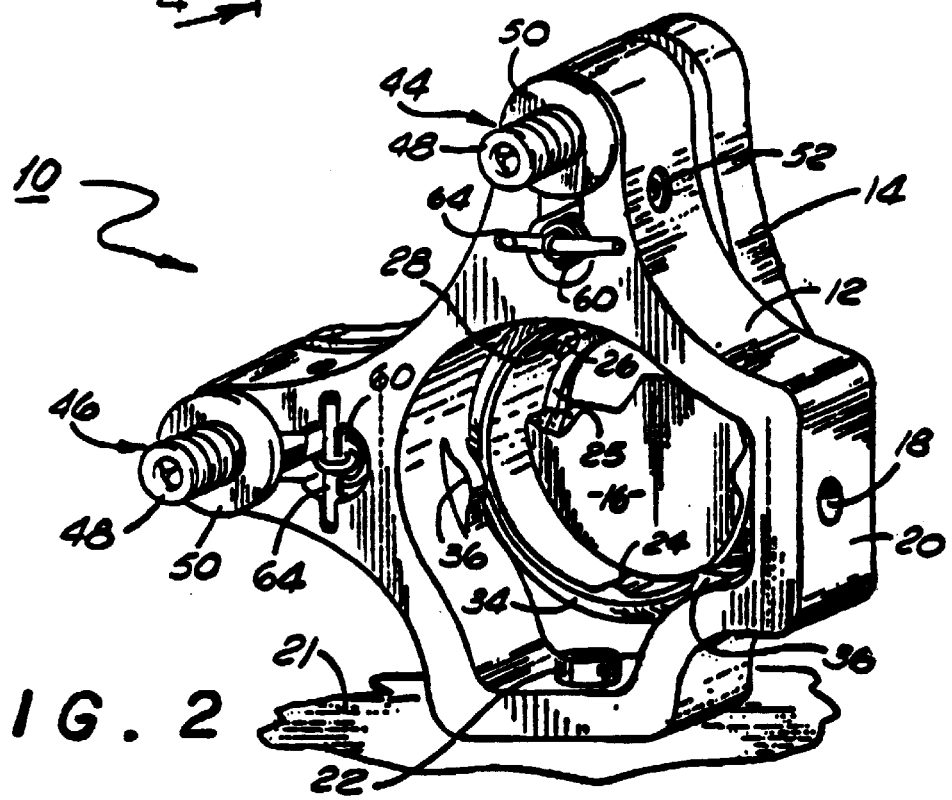
FIG. 2 is a rear perspective view of the optical mount.
Figure 3:
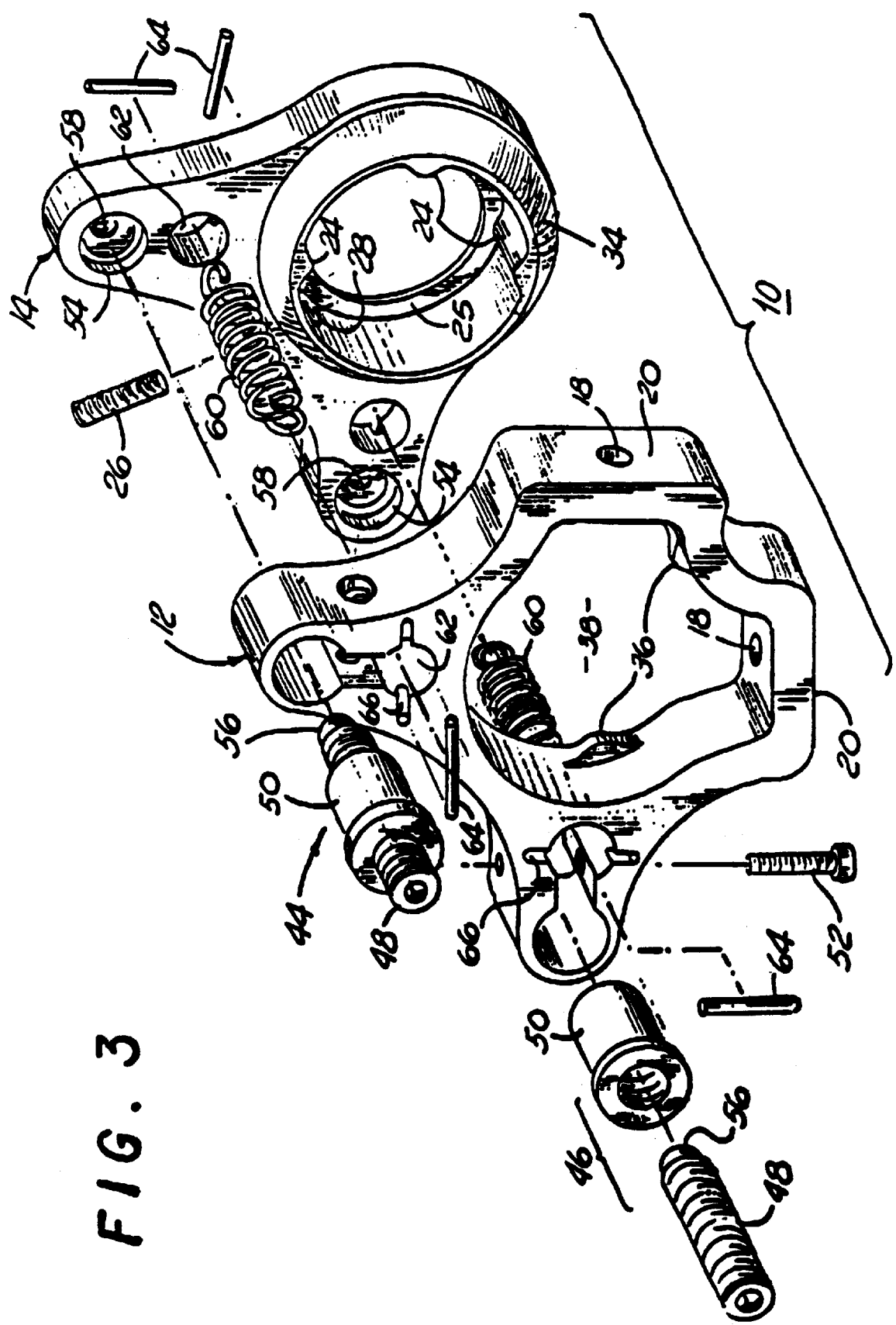
FIG. 3 is an exploded view of the optical mount.

Referring to the drawings more particularly by reference numbers, FIGS. 1–4 show an embodiment of an optical mount 10 of the present invention. The mount may include a first plate 12 and a second plate 14. The second plate 14 may hold an optical element 16 such as a mirror. Although a mirror is shown and described, it is to be understood that the mount 10 may support other optical elements such as lenses or diffraction gratings.

The first plate 12 may include a pair of mounting holes 18 that extend through a pair of corresponding mounting surfaces 20 which allows an operator to drive the mount with either the left or right hand. One of the mounting surfaces 20 can be placed onto the surface of an optical table or other surface 21. A fastener 22 can be inserted through the hole 18 to attach the mount 10 to the table.

The optical element 16 may be located within a center opening 23 of the second plate 14 and supported by a pair of ridges 24 and an inner lip 25. The ridges 24 provide radial support for the optical element. The element 16 may be secured within the opening 23 by a set screw 26 that extends through a threaded aperture 28 of the second plate 14. Other conventional means may also be used to secure the optic.

The second plate 14 may have a spherical bearing surface 34 that is supported by a plurality of seats 36 that extend into a center opening 38 of the first plate 12. The seats 36 may each have a mating surface 40 that locates the spherical bearing 34 of the second plate 14 to allow gimbal movement of the optical element 16.

The spherical bearing surface 34 has a center C that coincides with a point on an optical surface 42 of the optical element 16. The second plate 14 and optical element 16 will pivot about the center point C of the optical surface 42. This allows the optical element 16 to be tilted without spatially moving the center point and introducing a spatial shift in the light reflected from the element 16.

Figure 4:
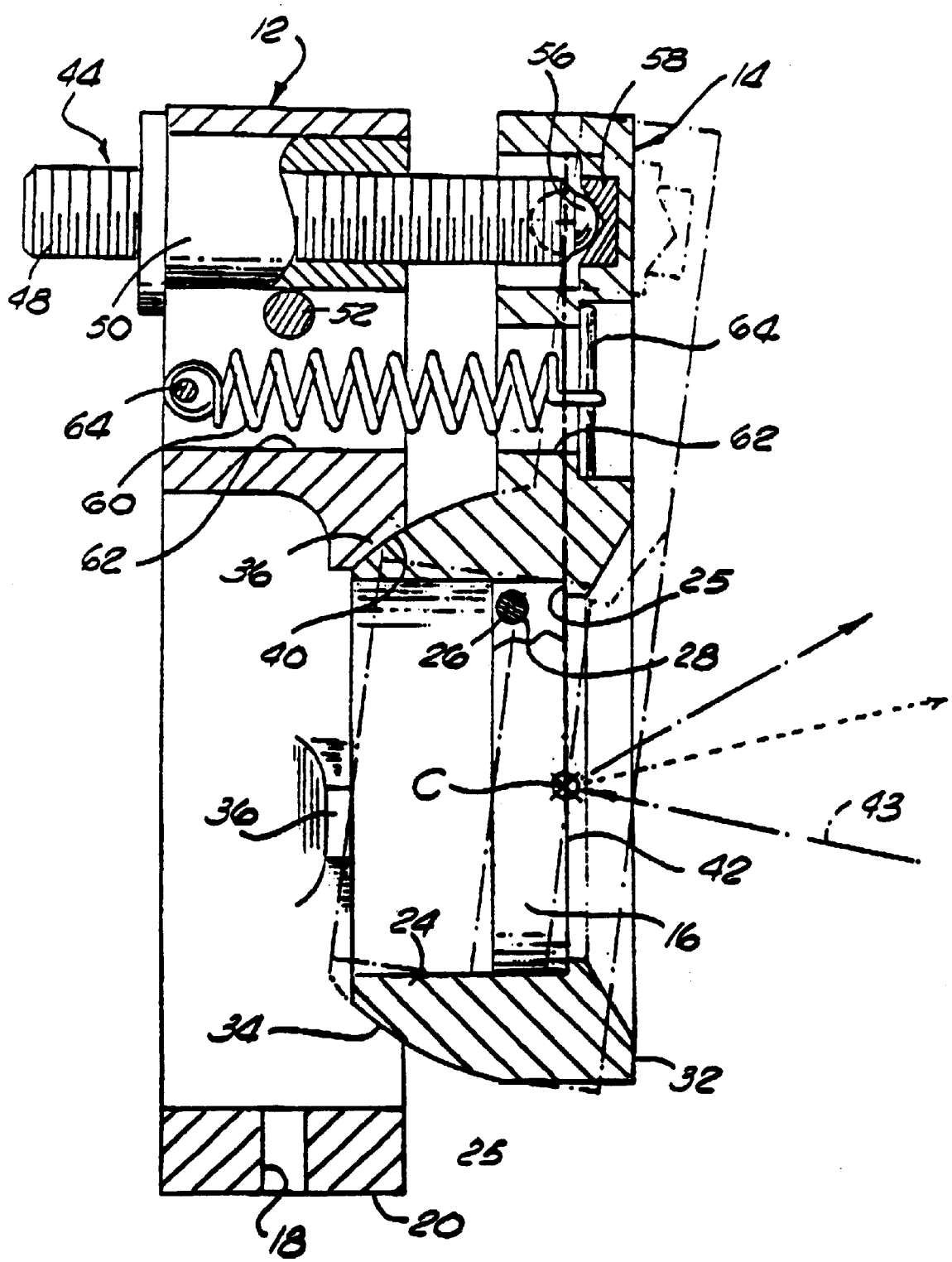
FIG. 4 is a cross-sectional view of the optical mount.

By way of example, as shown in FIG. 4, a beam of light 43 may be reflected from the center point C. Pivoting the optical element 16 about the center point as shown in phantom will change the angle of incidence of the beam but not vary the location of the center point in space. Thus rotation of the mirror will not introduce a spatial phase shift in the reflected light.

The mount 10 may have a first adjustment device 44 and a second adjustment device 46 that can induce relative movement between the first 12 and second 14 plates. Each adjustment device 44 and 46 may include a screw 48 that cooperates with an internally threaded sleeve 50 that is inserted into the first plate 12. The mount 10 may also have a pair of screws 52 that clamp the first plate 12 onto the sleeves 50.

Each screw 48 may extend into depressions 54 within the second plate 14. The screws 48 may have ball portions 56 that engage seats 58. The first 12 and second 14 plates may be constructed from the same material such as an iodized aluminum to minimize the amount of galling between the plates 12 and 14.

The ball portions 56 of the screws 48 may be biased into the seats 58 by a pair of springs 60. The springs 60 may extend through openings 62 in the plates 12 and 14 and secured to pins 64 that are located within corresponding slots 66.

Rotation of an adjustment screw 48 in one direction can push the second plate 14 away from the first plate 12 and induce a corresponding pivotal movement of the optical element 16. Rotation of a screw 48 in the opposite direction will allow the springs 60 to pull the second plate 14 toward the first plate 12 and induce a corresponding pivotal movement of the optical element 16.

The longitudinal axis of the screw 48 for the first adjustment device 44 may intersect an x-axis that passes through the center point C of the optical surface 42. The longitudinal axis of the screw 48 for the second adjustment device 46 may intersect a y-axis that passes through the center point C of the optical surface 42. Such a configuration provides a gimbal mount wherein the optical element 16 can be rotated about the x-axis by only manipulating the second adjustment device 46 and rotated about the y-axis by only manipulating the first adjustment device 44. The mount of the present invention thus allows an operator to easily rotate the optical element about an axis by manipulating only one adjustment device.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although manually actuated screws are shown and described, it is to be understood that the adjustment devices may be motorized.

What is claimed is:

1. An optical mount that can hold an optical element which has an optical surface with a center point, comprising:

a first plate;

a second plate that can hold the optical element and has a spherical bearing surface with a center that coincides with the center point on the optical surface;

a single first adjustment device coupled to said second plate; and, a single second adjustment device coupled to said second plate.

2. The optical mount of claim 1, wherein said first plate has a plurality of seats that cooperate with said spherical bearing surface of said second plate.

3. The optical mount of claim 1, wherein said first and second adjustment devices each include a screw that engages said second plate.

4. The optical mount of claim 3, wherein said first and second adjustment devices each include a spring that biases said second plate into said screw.

* * * * *